B. W. SCHUMACHER
A. E. GRUEN
INVENTORS

United States Patent Office 2,952,776
Patented Sept. 13, 1960

2,952,776

MEANS AND METHOD FOR THE MEASUREMENT OF LOCAL LOW GAS DENSITIES

Berthold W. Schumacher, Toronto, Ontario, Canada, and Arnold E. Gruen, Erlangen, Bavaria, Germany, assignors to Ontario Research Foundation, Toronto, Ontario, Canada Filed Sept. 5, 1958, Ser. No. 759,239

13 Claims. (Cl. 250—71)

This invention relates to the measurement of local gas densities and more particularly to such measurements in the low density region.

With the advent of high altitude rockets and aircraft, it has become desirable to examine the flow characteristics of various objects under actual or simulated flight conditions.

In the past the examination of flow patterns, i.e. the local gas density surrounding an object maintained in the gas stream, has been carried out by such well known optical methods as the interferometer, shadowgraph and schlieren light refraction methods. All of these methods have given excellent results in producing a visible flow pattern where the gas is approximately at atmospheric density. If the gas density is lower than, say one-hundredth of atmospheric density or lower, down to, say, one-millionth however, there are not sufficient molecules present in the gas stream to get an appreciable and determinable optical effect, and the methods mentioned above have failed.

As had already been pointed out, the advent of high altitude rockets and aircraft has made it necessary to determine flow characteristics of various objects in such lowered densities and this invention is drawn to a novel method and apparatus which will permit the determination of local gas densities and thus flow characteristics in such reduced densities either under the simulated conditions such as may exist in a wind tunnel or under actual flight conditions.

The invention also has application in any other field in which it is sought to determine the local density of a low density gas such as in internal combustion engines where the density is lowered due to high temperature of the gases or other reasons and the gas turbine art.

There are methods known and used in the low density region based upon the principle of the self-illuminescence of gas either due to high temperature, electric excitation (between electrodes or under the influence of a high frequency field) or due to reactions between activated molecules which produce a so-called afterglow. All of the former methods of which we are aware, however, suffer from one or more serious disadvantages which will now be discussed briefly.

Those methods based on the self-illuminescence of the gas, fall generally into two categories namely:

(a) That class in which the afterglow principle is used i.e. where the flowing gas has been excited to produce both a glow and an afterglow by an electrical discharge of any kind previous to the entry of the gas into the observation field; and (b) Those methods in which the gas is excited directly in the observation space by means of electrodes or a high frequency discharge.

Those methods depending upon afterglow principles are confined in application to special gases and are restricted to a limited range of low densities. Furthermore in the practice of the afterglow method, while the representation of differences in density is excellent, a quantitative interpretation of the results is, as a practical matter, impossible, since density is only one factor influencing the luminescence of the gas. Temperature and the degree of excitation also affect the luminescence and all of these quantities, which may be indeterminable or which may change along a given flow line, make it impossible to obtain a quantitative interpretation.

The direct excitation method also renders it impossible to obtain a quantitative interpretation and, moreover, is confined to a very limited low density range since the electrical fields producing the excitation are themselves a function not only of the gas density but also of the shape of the models and other quantities.

A further method sometimes employed is based upon the attenuation of beams of electromagnetic radiation (X-rays, ultra-violet rays, infra-red rays) or corpuscular beams such as ions or electrons. While the attenuation methods have no limitations as to density and can be used down to very low density, the method gives an integral value over the path length of the beam and where, as will most frequently be the case density is not homogeneous over the beam path, this fact cannot be determined and thus the local density cannot be calculated from attenuation methods except in the rare case where there is actual symmetry of density over a beam path. Local density fluctuation due to turbulence or due to sound waves cannot be detected by the attenuation method.

There are many examples of literature on the existing methods. The optical methods based upon interferometer, shadowgraph and schlieren pictures are described in such technical publications as R. G. Folsum, "Flow Visualization in High Vacuum," Chemical Engineering Progress, vol. 48 (1952), pages 542 to 548; the afterglow method in the same publication; and the attenuation method in an article appearing in the 1953 issue of Journal of Applied Physics, vol. 24, pages 1527–1528, "Electron Shadowgraphs and Afterglow Pictures of Gas Jets at Low Densities."

It is, therefore, an important object of this invention to provide a method and apparatus for determining the local density of a gas in the low density region, which will permit both qualitative and quantitative determination of the local gas density.

It is another important object of this invention to provide such a method and apparatus as will not be limited to any particular gas.

It is a further important object of this invention to produce a reliable method and apparatus, which may be employed both under test and actual flight conditions, and which will obviate many of the disadvantages inherent in the former practices outlined above.

These and other advantageous objects will become apparent through a consideration of the following detailed description taken in conjunction with the attached drawings in which.

Figure 1:
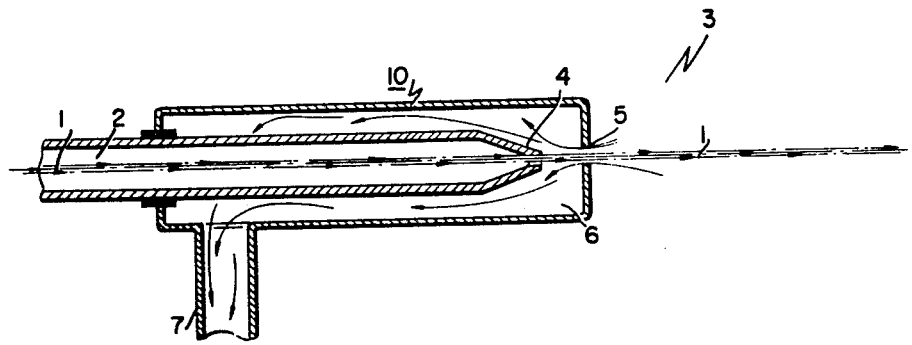
Figure 1 is a schematic vertical cross section of a pressure stage stretch, one of the elements of this invention.

The method of this invention consists broadly in a method of determining the local density of a gas comprising firing a confined corpuscular beam of known intensity and energy through the gas area to be examined, thereby producing an ascertainable degree of excitation along the beam path, and observing and determining only the short lived fluoroescence produced by such excitation while taking steps to eliminate the long lived excitation or afterglow from such observation and subsequently relating the observable intensity of such short lived fluorescence to the ascertainable relationship between fluorescence intensity and gas density.

In greater detail the method of the invention is based upon the concept of preliminarily producing a corpuscular beam of electrons or ions and firing this beam at high energy across the field desired to be measured.

According to the method of this invention the corpuscular beam, be it ions or electrons, is produced with sufficient energy so that, when the beam is fired into the gas observation space, there will be little or no spreading of the beam due to scattering. The particular energy value so selected will, of course, depend upon the density range sought to be measured, and simple observation and adjustment of the beam energy may be made to produce a beam of defined and confined dimensions which will produce no visible or deleterious scattering.

Such a well confined and defined electron beam of the energy likely to be encountered in the normal observation can be achieved by a conventional electron gun. These guns are well known in the art and are widely used for such applications as electron microscopes.

By way of example it has been observed that for gas density determination in the density of approximately $1 \times 10^{-7}$ grams per cubic centimeter and an observation field of 5" to 15" in width, an electron energy of ten to fifty kilovolts is required but this ratio as has been pointed out may easily be determined for any other desired density observation.

According to the method of this invention the corpuscular beam which, for ease of description it will hereinafter be assumed will be an electron beam, is passed from the vacuum in which it is produced into the observation space by means of a pressure stage stretch. This pressure stage stretch of which one of us is a co-inventor, is described in British Patent No. 777,426 and other foreign patents. Since this pressure stage stretch does not in itself form the subject matter of this invention it will not be described in detail, but as may be seen by reference to the British patent cited, the pressure stage stretch comprises a plurality of nozzles of the proper shape, distance and bore permitting passage of an electron beam therethrough from the high vacuum in which it is necessary to produce this beam into a region of higher density. The pressure stage stretch is in effect, a substitute for a foil window. A foil window would, in the present application, be impractical since in most cases it would scatter the particles rendering it impossible to produce a beam of confined and defined dimensions which is a prerequisite to the successful practice of this invention, and, in many cases under the high current densities sometimes necessary in the successful practice of this invention, could melt.

The pressure stage stretch will be placed in one wall of the wind tunnel or other observation space, or in the case of a flying aircraft, will be located close to one side of the field sought to be examined.

There are two properties of the electron beam thus directed into the observation space which must be ascertained namely:

(a) The energy of the electrons in the beam; and (b) The intensity of the beam, or beam current. Of these quantities the energy of the beam particles can, of course, be determined by the voltage on the electron gun. The intensity of the beam may be determined by a number of methods all of which are well known in this art, but, assuming that the invention is to be applied to a wind tunnel or other defined and confined observation space, it will be found useful to employ the well known Faraday cup or cage on the opposite side of the space from which the beam is fired to receive the beam and determine its intensity.

If a corpuscular beam (electrons or ions) is shot into a gas of low density, it will excite the gas atoms causing both long-lived and short-lived glowing. According to the manner of this invention if the energy of the particles is high enough and the particles are fired parallel into the gas space, the electron beam will thereupon be visible as a glowing straight line in the gas. The intensity of the luminescence excited over the path length depends upon:

(a) The current intensity of the beams;
(b) The energy of the particles; and
(c) The gas density.

As the gas density increases, a greater degree of luminescence will be provided in the beam and the intensity and energy of the beam being known or ascertainable, any observed degree of luminescence can be related to the gas density along the path, by means of simple calculations.

Thus according to the method of this invention the corpuscular beam fired into the observation space may be photographed or otherwise observed and the luminous intensity of each observation point determined from the photograph or other observation. Obviously the observation point must be selected so that it may observe the whole path length and thus an observation point at right angles to the direction of the beam is to be preferred, but not necessary.

As has already been suggested and as will immediately become apparent to those skilled in the art to which this invention is directed, the firing of such a beam of electrons across a flowing gas will give rise to both short-lived excitation and long-lived excitation of the so-called afterglow. As is well known a beam fired through a gas as described above will produce first of all a certain degree of ionization and secondly a certain number of gas atoms or molecules in a so-called excited state. If the excited atom drops back to its normal or ground state the process is accompanied by the emission of light, and the time at which the atom remains excited may vary between $10^{-8}$ seconds and several seconds depending upon the particular gas molecules and excitation states involved.

The long-lived excitation or afterglow, has as already been pointed out, been made the subject matter of a separate method of investigation and is subject to the many disadvantages already pointed out.

According to the manner of this invention it is necessary to eliminate this after-glow effect and to measure the luminescence of only the short-lived excitation (i.e. that having a period of existence of $10^{-6}$ seconds or less after excitation).

It will be appreciated that if a well confined beam of electrons is fired, as has already been described, through a jet of fast moving gas, the path of the electron beam will be visible as a fluorescent line, and, in the region where the gas is moving there will be an additional afterglow vane, the length of which will depend upon the degree of afterglow associated with the gas in question and the speed at which the gas is travelling.

It will immediately become apparent that any of the fluorescence and associated excitation states present in the afterglow vane will falsify density measurements, since this fluorescence depends upon the flow speed. It is therefore necessary according to the practice of this invention to eliminate the afterglow before an observation is made, so that the measurement of the luminescence which is subsequently related to gas density is the luminescence of only the short lived fluorescence which is independent of the rate at which the gas is moving.

Many ways by which the short lived luminescence can be eliminated will immediately become apparent to those skilled in this art. The most obvious method is to exclude the particular afterglow involved in any particular reading through the placement of a filter in front of the observation system, this filter being chosen as to be such to eliminate the spectrum lines of the afterglow.

The problem of separating the long lived and short lived excitation states and of eliminating the long lived state can also be accomplished by well-known spectrographic means.

The long lived fluorescence can also be excluded by selecting a short observation period and pulsing the beam, the short observation period being so related to the beam pulse as to eliminate the afterglow vane.

We have discovered that every gas contains at least a few lines in its spectrum attributable only to short lived excitation and not to long lived excitation or afterglow. It will thus be possible in the case of every gas of which we are aware to discover some lines in the spectrum to which the observable fluorescence can be confined by filtering or spectroscopic means so as to permit examination of the luminosity of only the short lived lines.

It will also be appreciated that the selection of the proper filtering means will permit measurement of the partial density of each component of the gas as well as the total density through the selection of a filter which removes from the observing means, all but the particular spectrum lines attributable to the particular gas component, the partial pressure which is said to be determined. In certain cases the addition of another gas component to the system may quench the long lived afterglow which offers an additional method for eliminating long lived glow from being measured. It was further ascertained that changes in temperature which affect the afterglow intensity do not affect the intensity of the short lived glow, hence, do not interfere with our objective of quantitative measurements.

Since the energy loss of an electron beam in any excitation process is negligibly small compared with the total energy of an electron in the beam, the degree of excitation does not, for all practical purposes, change over even a long path-length. This fact allows us to relate the fluorescent light of every small section of the fluorescent line from which the afterglow effect has been eliminated, to the gas density in that section, i.e., the determination of the local gas density.

As has also been suggested, ions can be substituted for electrons in the beam which is employed according to the manner of this invention, and the term corpuscular beam when used here and elsewhere in the specification and clauses to be understood as meaning electrons or ions. The use of ions would present the advantage of a higher degree of excitation, but the degree of excitation in an ion beam would change to some extent along the length of the path. If ions are preferable to electrons for any reason whatever, this change along the path-length can be compensated for by subsequent calculation.

The practice of the method above described will give a glowing line, through the gas to be observed, the intensity of which at any given point will afford a calculable measure of the gas density at such point. The observation and the measurement of the light may be accomplished by any of the well-known methods such as photographs subjected to subsequent analysis to determine light intensity, a photo electric cell capable of giving an indication of the brightness over the path-length, a so-called multiplier photo tube or any similar well-known device.

It will also be appreciated by those skilled in this art that while in most cases it will be possible and advisable to determine the intensity of luminescence of the whole path of the beam through a single observation whereupon the luminescence of various segments may be subsequently determined, it is also conceivable that an observation system adapted to scan the beam path automatically and to record the intensity of luminescence of any segment of the beam path so scanned may be employed. The provision of such a scanning observation means is well within the skill of those in this art.

If the invention is employed within the available confines of a wind tunnel or other well defined observation space, the volt meter of the electron gun and the Faraday cup will determine the energy of the beam and the degree of excitation, both of which quantities are necessary for a numerical relationship between the degree of luminescence and the gas density related to such luminescence. It will also be apparent that there may be more than one observation system. If one observation system only is used it will be first necessary to calibrate the observation system by observing the fluorescence at a point where the density is already known and obtain a figure for a degree of luminescence therefor. The Faraday cup can be eliminated, as it will undoubtedly be necessary to eliminate it if the invention is applied to flying objects under actual flight conditions, through the use of a secondary observation system. The primary observation system will be used to examine the intensity of the beam fired as already described and the secondary system will be used to record the luminescence at a point of known density simultaneously thus providing a base for the determination of the local gas density in the electron stream. It is similarly possible, and well within the skill of those in the electronic art, to project a picture of the glow line on the photocathode of a television receiving tube e.g. an image-orthicon tube where it may be scanned by electronic means after a shorter or longer storage period. It is also obvious that the electron beam can be modulated in intensity, e.g. pulsed, and the light detector can be connected to an amplifier which is tuned to the "fixed" modulation frequency, measuring in effect, only light of the modulation frequency but not continuous light from other sources. This is of importance in the application of the invention to free flying objects where skylight may be present.

The use of a pulsed beam with a "variable" pulse frequency will further enable us to employ our method to study periodic density fluctuations stroboscopically.

Similarly, if we use a steady electron beam but a light detector and associated oscillograph with good response to high frequencies we can measure turbulence fluctuations and sound fluctuations etc. The necessary electronic means are well known in the art. It may be pointed out, however, that none of the other methods for density measurements would allow the observation of such local fluctuations of the density.

It will further be appreciated that any electronic means may be used to compare the two readings of two or more observation systems to obtain a calibration of the system under the conditions then in existence.

For instance instead of a single beam of electrons as described above a plurality of simultaneous beams directed parallel to each other may be used and one observation system used with a field large enough to embrace the luminescence produced by all beams.

Again a sweeping or scanning beam may be employed adapted to scan any defined observation space. This scanning effect may be produced electrically by deflecting the electron beams upon the entry into the observation space by varying amounts to one side or the other, or mechanically by varying the physical position of the electron gun and of the pressure stage stretch which permits the electron beam to leave the vacuum and enter the observation space. An arrangement may be employed where the beam from one electron gun is periodically deflected by an electromagnet thus producing a plane of excitation, instead of a single line. Obviously, several closely spaced planes of excitation could be produced. The means to do that are well known in the electronic art.

The invention may be used to determine the density of the air around the wing of an airplane in flight using two observation systems simultaneously.

Reference will now be made to the drawings which illustrate some of the possible embodiments of the invention described generally above.

Figure 1 illustrates in vertical cross section a typical embodiment of the pressure stage stretch which is the subject matter of British Patent No. 777,426. According to this invention, a beam of electrons 1 is passed from the vacuum 2 in which it is produced to atmospheric or at least lesser vacuum pressure at 3. The invention contemplates a series of nozzles 4 and 5, separated by a chamber 6 which is kept evacuated via outlet 7 by means of a vacuum pump (not shown). The particular embodiment shown has two stages i.e. two nozzles and a single separating chamber. The apparatus may be elongated and any desired number of stages incorporated to permit passage of the electrons from the high vacuum in which they are produced into a space maintained at any desired pressure. This pressure stage stretch which is common to all the embodiments of this invention is, in effect, a substitute for the conventional foil window overcoming many of the well known disadvantages of the foil window. The pressure stage stretch is indicated generally in Figure 1 and the other drawings as 10.

Figure 2:
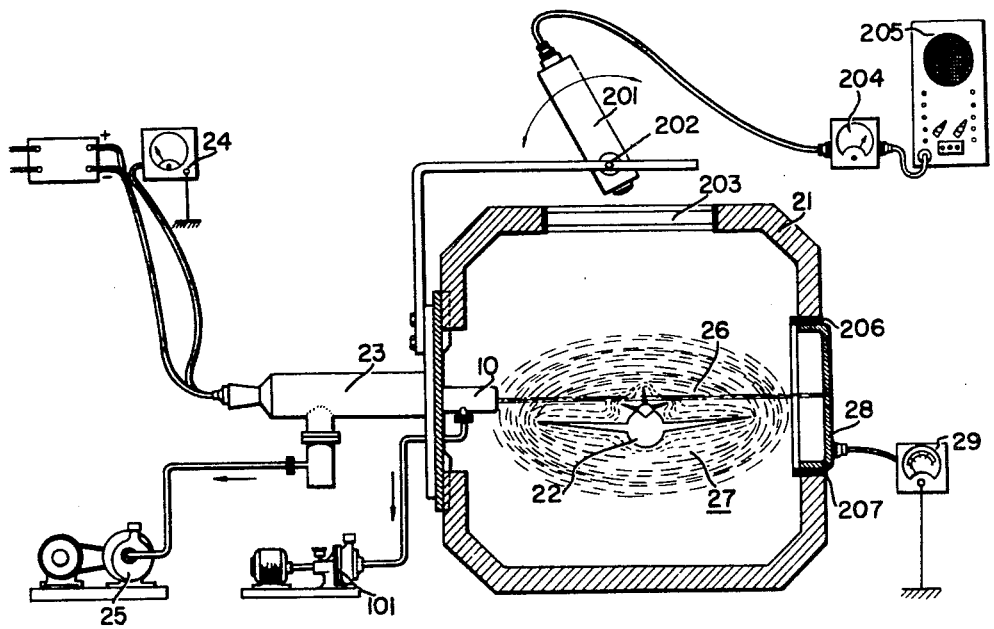
Figure 2 is a schematic vertical cross section taken through a wind tunnel and illustrating one embodiment of this invention.

The simplest and most basic embodiment of the present invention is shown schematically in Figure 2. In this drawing, 21 represents a wind tunnel in which the flow characteristics about an object 22 are under investigation.

The apparatus required to carry out the method of the invention already described comprises an electron gun 23 of any desired type together with a power supply of high voltage and a voltmeter 24. The electron gun will have an associated vacuum source shown in the drawings as 25. The electron gun is adapted to produce an electron beam of defined and confined dimensions which will be fired at a high energy across the wind tunnel 21 via the pressure stage stretch 10. The vacuum supply for the pressure stage stretch is indicated as 101.

According to the manner of the invention already described, the electron beam 26 is fired across the flow pattern (indicated generally as 27) sought to be examined.

A Faraday cup located in the wall of the wind tunnel 21 and insulated therefrom by insulators 206 and 207 has an associated ammeter 29 for the purpose of ascertaining the intensity of the beam.

The luminescence may be observed and determined by means of a photocell 201 pivotable as at 202 so as to render the whole beam path observable via a glass window 203 in the wind tunnel wall. This photocell 201 is shown as connected to an amplifier and meter 204 and an oscillograph 205.

Figure 3:
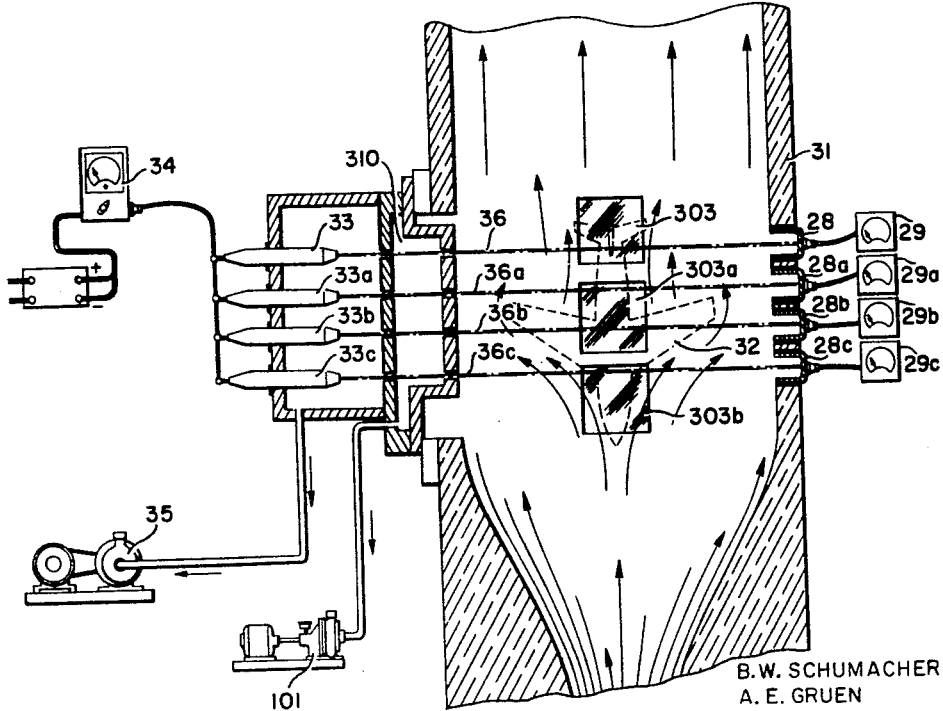
Figure 3 is a schematic horizontal cross section taken through a wind tunnel and illustrating an alternative embodiment of the invention.

An alternative embodiment is shown in Figure 3. In this view, which is a schematic horizontal cross section, the object, the flow characteristics of which are to be examined is shown as 32 located in a wind tunnel 31. In this case, four parallel beams of electrons 36, 36a, 36b and 36c are fired across the flow lines to be examined. Four electron guns 33, 33a, 33b and 33c are employed, having a single prime vacuum source 35. A high voltage is supplied to the guns, and a voltmeter 34 is adapted to record the voltage thereof.

These four parallel beams pass through a pressure stage stretch 310 which has a source of vacuum 101 functioning as already described with reference to Figure 1. Four Faraday cups 28, 28a, 28b and 28c with associated ammeters 29, 29a, 29b and 29c function as before. The beams may be observed through glass observation ports 303, 303a and 303b in the tunnel walls.

Figure 4:
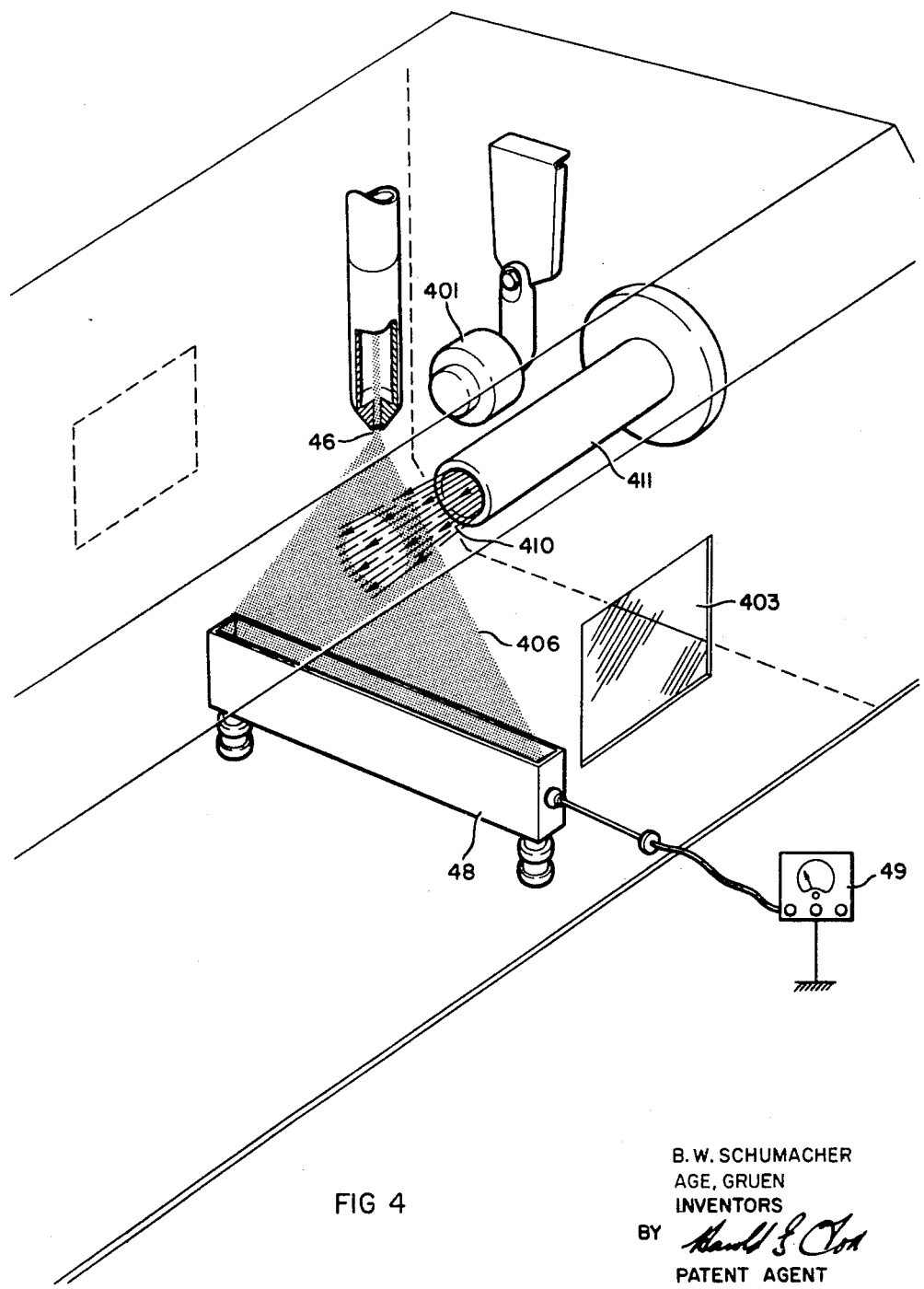
Figure 4 is a schematic view showing some of the operating equipment arranged in a further embodiment of the invention.

Figure 4 illustrates schematically how an electron beam may be deflected by means of an electromagnet 401 supplied with an alternating current to provide thereby a fan shaped beam 406 which in this case is illustrated as being employed to study the local density of the discharge of gas 410 from a gas jet nozzle 411. The fan shaped electron beam is caught by the elongated Faraday cup 48 which is provided with an ammeter 49 for the purposes stated above. The beam may be observed through glass window 403.

Figure 5:
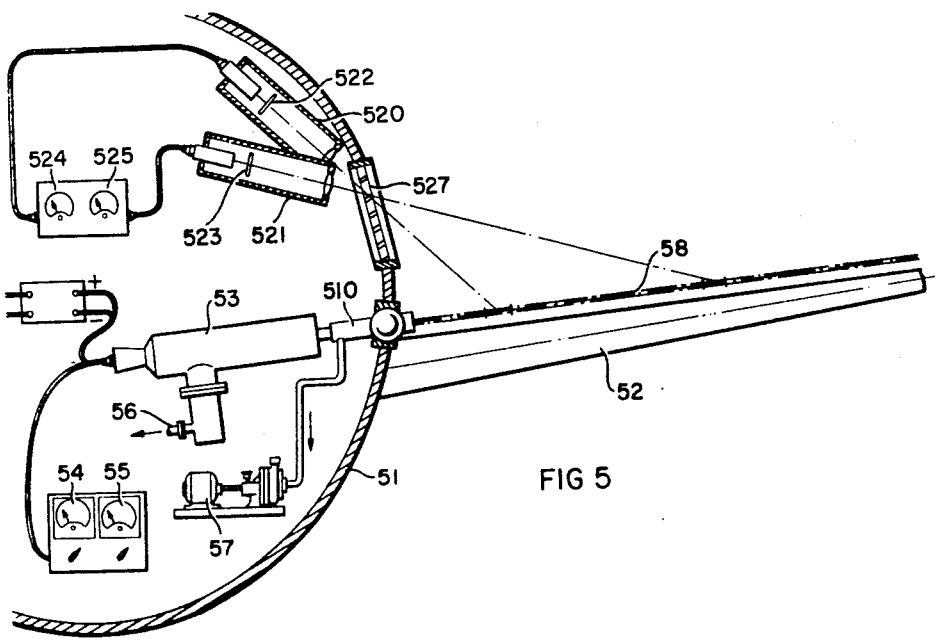
Figure 5 is a schematic view of yet another embodiment of the invention as applied to a free flying body.

Figure 5 illustrates the application of the invention to a free flying object as distinguished from the confines of a wind tunnel. In this illustration the equipment is located within the fuselage 51 of an aircraft, and it is sought to measure the local gas density above the wing 52. To this end an electron gun 53 is supplied with a high voltage current, and has associated therewith, ammeter 54 and voltmeter 55 for measuring beam voltage and current. Vacuum is supplied to the electron gun through 56. The electron beam passes from the gun through the pressure stage stretch 510 with its associated vacuum source 57 and the electron beam is directed as a defined and confined beam 58.

The fluorescence of the beam is examined by two observation systems 520 and 521 each of which is equipped with a colour filter 522 and 523 respectively adapted to eliminate long lived fluorescence, and associated intensity measurement means 524 and 525 adapted to record the degree of short lived luminescence of the parts of the beam observed. One of the observation systems will be trained through a glass observation port 527, on a point of known or ascertainable gas density, thus establishing a reference for the correlation of the luminescence observed by the other system to the absolute gas density.

The invention has been described with reference to preferred embodiments and it is to be understood that many obvious amendments to the embodiments described may be made without departing from the spirit of the invention.

The various means necessary to carry out the invention which have been described specifically may also be replaced by electrical or electronic equivalents many of which are well known or may soon become well known in this art.

The advantages of the invention will be obvious from a consideration of the foregoing method as will the manner in which the practice of the invention overcomes many of the disadvantages inherent in prior practices.

Such embodiments of the invention as come within the scope and purview of the appended claims are to be considered as part of this invention.

What we claim as our invention is:

1. Apparatus permitting the determination of the local density of a gas comprising a source of a well defined corpuscular beam, means permitting the passage of the said beam into an observation space containing the gas and means for quantitatively observing the intensity of only the short lived fluorescence excited in the gas by the beam.

2. Apparatus permitting the determination of the local density of a gas comprising a source of a well defined corpuscular beam, means permitting the passage of the said beam into an observation space containing the gas, and means for quantitatively observing the intensity of only the short lived fluorescence of at least one selected spectrum line excited in the gas by the beam.

3. Apparatus permitting the determination of the local density of a gas comprising a source of a corpuscular beam of sufficient energy to provide a confined beam with negligible scattering through the gas area to be examined, means for permitting the passage of such beam into an observation space containing the gas, means for determining the intensity of the beam, means for determining the energy of the beam particles, and means for observing and measuring the degree of only short lived fluorescence excited in the gas by the beam.

4. Apparatus as claimed in claim 3 together with means for eliminating the disturbing spectrum lines of the long lived fluorescence.

5. Apparatus as claimed in claim 4 wherein said means for eliminating the disturbing spectrum lines of the long lived fluorescence comprises an optical filter interposed between the observing means and the beam.

6. Apparatus as claimed in claim 3 wherein said observation means is capable of scanning said beam, thereby observing and measuring the fluorescent intensity of a segment of the beam at a time.

7. Apparatus as claimed in claim 3 together with means causing said beam to scan an ascertainable area of said observation space.

8. Apparatus as claimed in claim 6 wherein said observation means comprises at least two independent observation systems, one system adapted to observe a fixed spot of known gas density, as a reference point, and the other system adapted to scan the beam.

9. Apparatus as claimed in claim 6 together with a photocathode tube adapted to store the beam, and electronic means adapted to scan the thus stored picture to determine the local intensity thereof.

10. Apparatus as claimed in claim 7 together with mechanical means adapted to shift the electron gun to cause the beam to scan said observation space.

11. Apparatus as claimed in claim 7 together with electronic means adapted to shift the beam thereby causing it to scan an ascertainable area of the observation space.

12. Apparatus as claimed in claim 3 together with means for pulsing the beam with a fixed frequency and means for selectively measuring the light in said frequency.

13. Apparatus as claimed in claim 3 together with means for pulsing the beam in a variable frequency and stroboscopic means for observing the luminescence excited thereby.

References Cited in the file of this patent
UNITED STATES PATENTS

| | | |
|---|---|---|
| 1,676,984 | Fales et al. | July 10, 1928 |
| 2,550,107 | Coltman | Apr. 24, 1951 |
| 2,632,114 | Silvertooth | Mar. 17, 1953 |
| 2,640,948 | Burrill | June 2, 1953 |
| 2,642,537 | Carroll et al. | June 16, 1953 |
| 2,659,012 | Bromberg et al. | Nov. 10, 1953 |

OTHER REFERENCES

Solving a Wind Tunnel Problem by McLarren, Aviation Week, June 20, 1949, pages 19, 20, 22 and 24.